United States Patent [19]
Hermans et al.

[11] Patent Number: 5,133,698
[45] Date of Patent: Jul. 28, 1992

[54] POWER DRIVEN ACTUATOR SYSTEM

[75] Inventors: Robert J. Hermans, Rockford; Steven J. Myers, Roscoe, both of Ill.

[73] Assignee: Sundstrand Corporation, Rockford, Ill.

[21] Appl. No.: 403,813

[22] Filed: Sep. 7, 1989

[51] Int. Cl.$^5$ .............................................. F16H 1/28
[52] U.S. Cl. ...................................... 475/342; 475/338; 475/332; 74/89.16
[58] Field of Search .............. 475/338, 341, 342, 332; 74/89.16, 411; 244/49

[56] References Cited

U.S. PATENT DOCUMENTS

| | | | |
|---|---|---|---|
| 3,033,059 | 5/1962 | Melton et al. | 475/342 X |
| 3,203,275 | 11/1962 | Hoover | 74/665 |
| 3,640,150 | 2/1972 | Leiner et al. | 475/332 |
| 4,575,027 | 3/1986 | Cronin | 244/75 R |
| 4,688,744 | 8/1987 | Aldrich | 74/411 X |
| 4,726,259 | 2/1988 | Idler | 475/342 X |
| 4,742,730 | 5/1988 | Dorn et al. | 475/342 X |
| 4,751,855 | 6/1988 | Hudson et al. | 475/332 |
| 4,754,949 | 7/1988 | Fukamachi | 475/342 X |
| 4,760,964 | 8/1988 | Burandt | 475/342 X |
| 4,786,013 | 11/1988 | Pohl | 244/75 R |
| 4,825,723 | 5/1989 | Martin | 475/342 X |
| 4,932,613 | 6/1990 | Tiedeman et al. | 74/89.16 X |

Primary Examiner—Allan D. Herrmann
Assistant Examiner—Khoi Q. Ta
Attorney, Agent, or Firm—Wood, Phillips, Mason, Recktenwal & VanSanten

[57] ABSTRACT

The problem of reducing the number of parts and reducing the manufacturing costs of actuator arms in a power driven actuator system of a type including a planetary gear train (42), is solved by providing an elongate torque shaft (40) coupled to the gear train. A pair of ring gears (56a, 56b) are spaced longitudinally of the torque shaft (40) as part of the planetary gear train (42). Each ring gear (56a, 56b) has identical actuator arm mounting portions (64) facing in opposite axial directions of the torque shaft (40). A pair of asymmetrical actuator arms (16) project radially outwardly of the torque shaft. Each actuator arm has identical mounting portions (66) on opposite axial sides thereof complementary to the mounting portions (64) on either ring gear (56a, 56b) for interchangeably mounting either asymmetrical actuator arm on either ring gear to be driven thereby.

5 Claims, 2 Drawing Sheets

5,133,698

POWER DRIVEN ACTUATOR SYSTEM

FIELD OF THE INVENTION

This invention generally relates to powered actuators and, particularly, to a power driven actuator system of a type including a planetary gear train with ring gears for rotating actuator arms.

BACKGROUND OF THE INVENTION

Powered actuator systems have a variety of usages in aircraft or aerospace applications, such as to actuate control surfaces, doors, foldable wings and the like.

One type of power driven actuator system utilizes a planetary gear train having one or more planetary gear sets. Often, the outer ring gear or gears of the planetary gear train are coupled directly to the actuator arms for the control surface, door, foldable wing and the like. Most often, at least a pair of actuator arms are used to actuate or move the control surfaces for a variety of reasons, but if for no other reason than to rigidify the surface and provide for uniform movement. Therefore, the actuator arms often are asymmetrical in both a radial direction and an axial direction of the planetary gear set. In fact, the actuator arms may not even be of the same size.

Typically, particularly where identical actuator arms can be used, the arms are constructed of a one-piece construction, such as of forged steel, and the respective ring gear is formed integrally therewith as an internal ring gear portion at one end of the arm. However, where asymmetrical arms are used, and particularly in actuator systems in aerospace applications, various problems result from this typical construction. For instance, where such left and right-hand parts are used, machining and overall processing adds manufacturing and inventory costs. In addition to the cost factor, unnecessary strength and weight associated with an integral all-steel construction of the actuator arms is undesirable in aerospace applications where size and weight parameters are critical. In other words, hardened steel may be necessary for the ring gear and its associated bearing race, but such strength requirements and resulting excessive weight is unnecessary for the entire actuator arm construction and very undesirable in aerospace applications.

Another problem with the typical one-piece construction involves distortion resulting from heat treatment. Due to the size and varied cross section of most actuator arms, a one-piece construction, involving heat treatment to harden the steel for the gear portion, would add operations to straighten, remachine and realign the actuator arm portion following heat treatment.

Consequently, it is more desirable, particularly in aerospace applications, to have an actuator system wherein the driving ring gears and the actuator arms are separate components. The ring gears thereby can be fabricated of hardened steel and the actuator arms can be fabricated of lightweight material, such as forged aluminum. However, such a two-piece construction then creates its own problem of requiring excessive inventory because of the typical asymmetrical or "right and left-hand" nature of most actuator arms. This again gets back to the manufacturing and inventory cost dilemma.

This invention is directed to solving these problems by providing an actuator system of a "universal" type wherein common or universal ring gears are used in conjunction with asymmetrical actuator arms in such a manner that the actuator arms can be mounted in alternative positions on the universal ring gears and thereby require only one ring gear construction and one asymmetrical actuator arm construction, but interchangeably positioning the ring gears and actuator arms at plural positions in the actuator system.

SUMMARY OF THE INVENTION

An object, therefore, of the invention is to provide a new and improved power driven actuator system of the character described and of a type including a planetary gear train.

Generally, the system includes power means having an elongate torque shaft coupled to the gear train. A pair of universal ring gears are spaced longitudinally of the torque shaft as part of the planetary gear train. Each ring gear has identical actuator arm mounting means thereon. A pair of asymmetrical actuator arms are provided for projecting radially outwardly of the torque shaft at different axial positions. Each actuator arm has identical mounting means on opposite axial sides thereof complementary to the mounting means on either ring gear for interchangeably mounting either asymmetrical actuator arm on either ring gear to be driven thereby.

In other words, by using universal ring gears in the same planetary gear train, along with plural but identical mounting means on the actuator arms, either side of either actuator arm can be mounted on either ring gear not-withstanding the asymmetrical or right and left-hand construction of the actuator arms.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
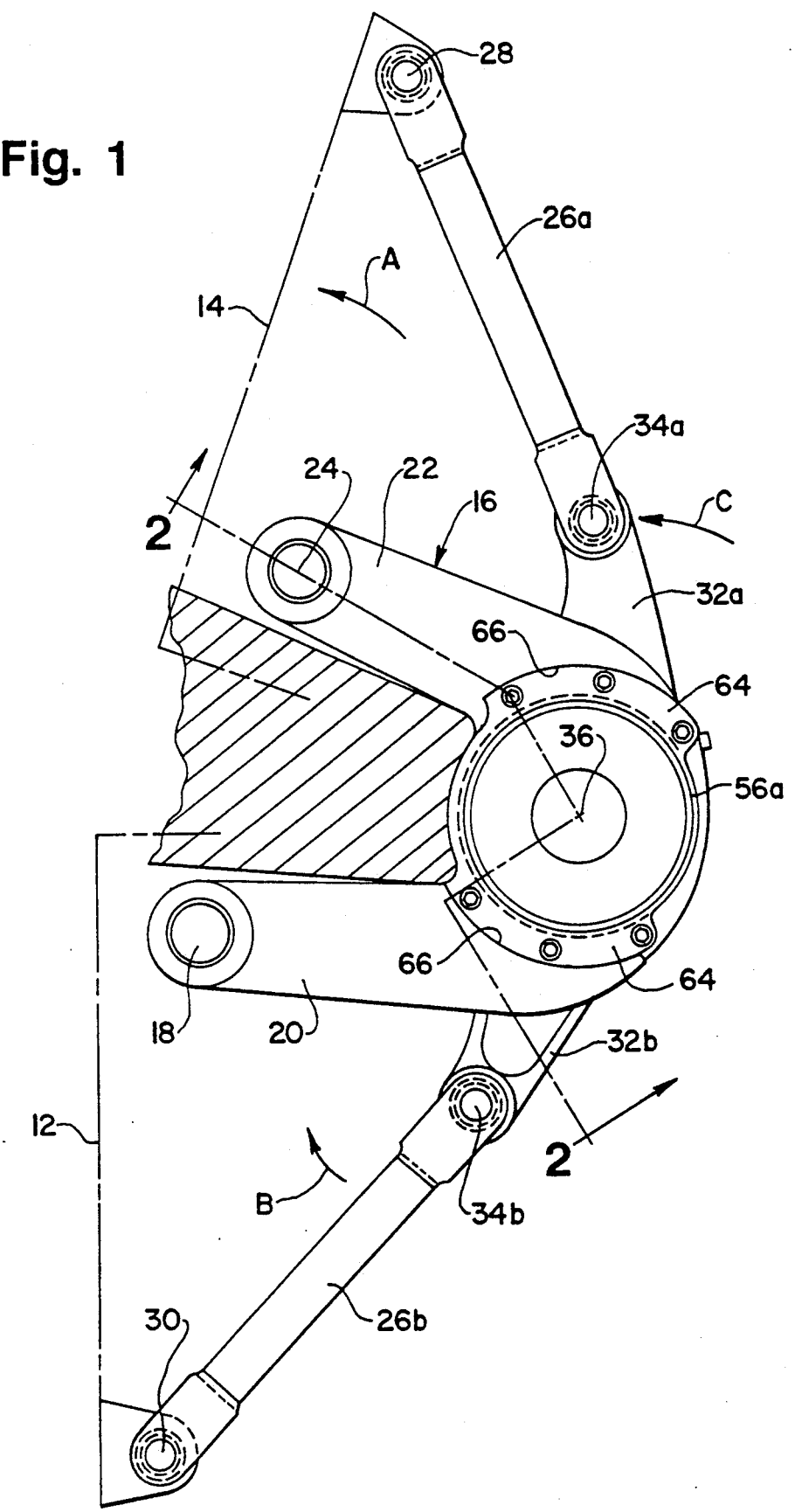
FIG. 1 is a plan view of a power driven actuator system incorporating the concepts of the invention, as embodied in a foldable aircraft wing.

Referring to the drawings in greater detail, and first to FIG. 1, the power driven actuator system of the invention is shown, for exemplary purposes, in an aircraft application for folding an outer wing portion relative to an inner wing portion of an airplane. Of course, it should be understood that the actuator system certainly has a wide variety of other applications.

For illustration purposes, an inner wing portion 12 and an outer wing portion 14 are shown in phantom in FIG. 1. The outer wing portion would be foldable in the direction of arrow "A" relative to inner wing portion 12. A generally U-shaped actuator arm, generally designated 16, pivots bodily about a fixed pivot 18 at the distal end of one actuator arm portion 20, the fixed pivot being on inner wing portion 12. A second actuator arm portion 22 is pivoted, as at 24, to outer wing portion 14. During folding of outer wing 14 in the direction of arrow "A", the entire actuator arm 16, including arm portions 20 and 22 along with pivot 24, all pivot bodily with outer wing 14 about fixed pivot 18 on inner wing portion 12.

Although not forming a specific part of the invention, such wing collapsing assemblies also include struts 26a and 26b pivotally connected to outer wing portion 14 and inner wing portion 12, respectively, as at 28 and 30, respectively. Strut arms 32a and 32b are pivoted to struts 26a and 26b, respectively, as at 34a and 34b, respectively. In this manner, as the actuator system folds outer wing portion 14 relative to inner wing portion 12 in the direction of arrow "A", pivot 34b and the respective connecting ends of strut 26b and strut arm 32b fold inwardly in the direction of arrow "B", while pivot 34a and the respective connecting ends of strut 26a and strut arm 32a move in a folding direction as indicated by arrow "C", until the outer wing portion becomes folded generally perpendicular to the inner wing portion. This type of wing folding assembly is generally conventional, as with foldable winged aircraft used on aircraft carriers.

To further facilitate a general understanding of such wing folding assemblies, it should be understood that the longitudinal axis of the actuator system is shown at 36 in FIG. 1. As is common, a motor (not shown in the drawings) is in line with this axis and moves bodily with the actuator system and actuator arm 16. The motor usually includes a driven torque shaft, as will be seen in FIG. 2, on line with axis 36.

As set forth in detail in the Background section, above, the problems solved by this invention revolve around the asymmetrical nature of many actuator arms in power driven actuator systems. This is true whether dealing with foldable wings, as described above, or other aircraft control surfaces, doors and the like. For instance, it can be seen in FIG. 1 that actuator arm 16 is generally U-shaped, including actuator arm portions 20 and 22 forming the legs of the "U". However, it can be seen that actuator arm 16 is not symmetrical. It can further be seen that leg or actuator arm portion 20 is longer than leg or actuator arm portion 22. In an actual scaled construction, the difference in length may be on the order of 0.48 inch. Furthermore, pivot 18 for actuator arm portion 20 is a further distance from section line 2—2 than pivot 24 for actuator arm 22. In an actual scaled construction of actuator arm 16, this difference in distance is on the order of 0.15 inch. These variances in dimensioning actuator arms of this character are encountered often in designing such actuator systems because of the precision movement required of the sometimes massive control surfaces which, themselves are difficult to reverse dimension to accommodate a symmetrical actuator arm system. Consequently, an entire myriad of problems result, as described in detail heretofore, when dealing with the asymmetrical nature of such a system.

Figure 2:
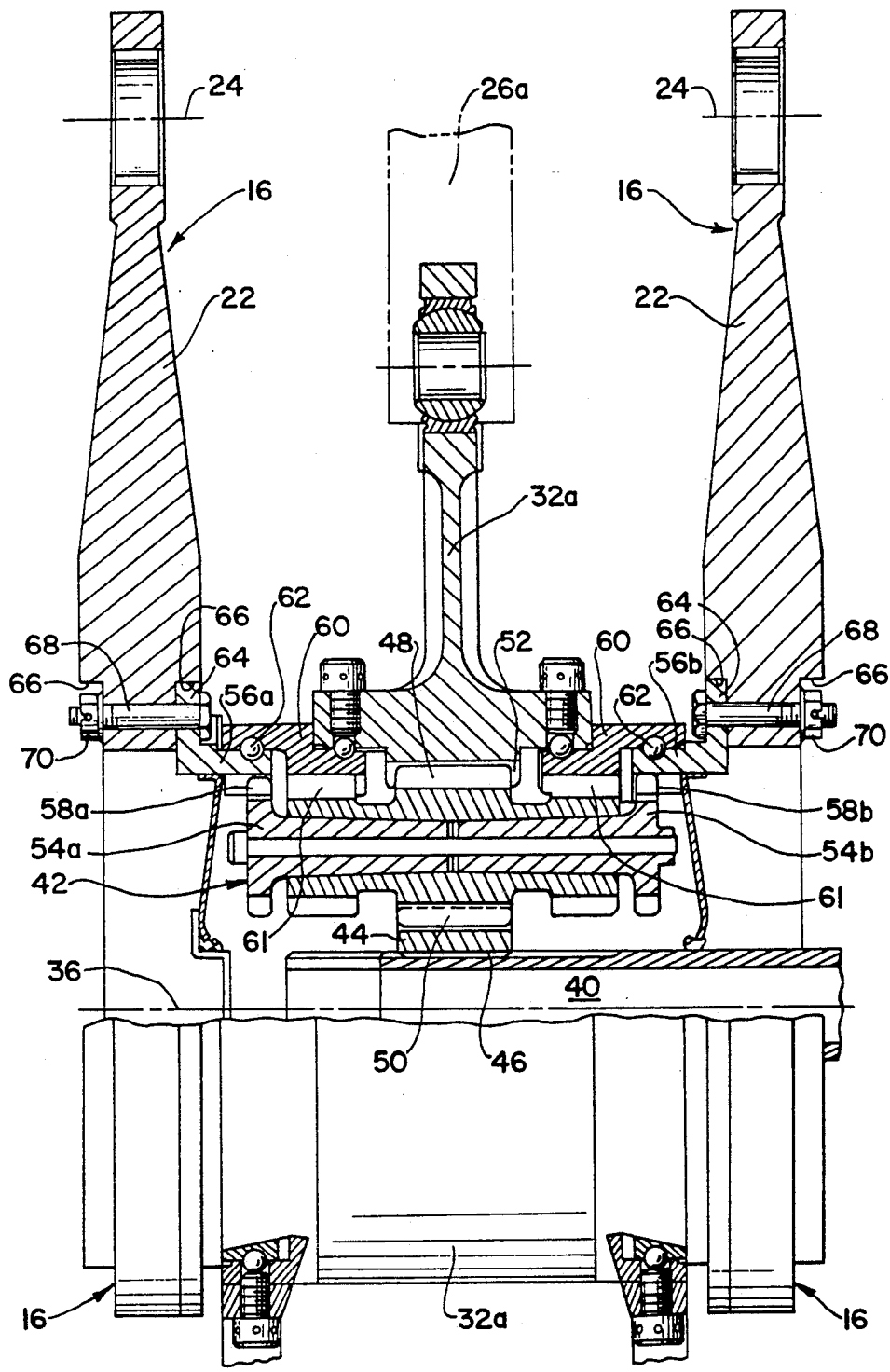
FIG. 2 is a section taken generally along line 2—2 of FIG. 1, but with the wing portions folded.

Referring to FIG. 2, a pair of actuator arms 16 are shown with pivot axes 24 corresponding to actuator arm portions 22 described in FIG. 1. In other words, FIG. 1 shows only one U-shaped actuator arm 16, and FIG. 2 shows only the one actuator arm portion 22 of a pair of actuator arms 16 spaced longitudinally of axis 36 of the system. Strut arm 32a also is shown in FIG. 2, along with a portion of strut 26a shown in phantom.

The actuator system is power driven by a torque shaft 40 coaxial with axis 36 and rotated by a motor (not shown) as described above. The torque shaft is coupled in a planetary gear train, generally designated 42. Specifically, a sun gear 44 is splined to torque shaft 40, as at 46, for rotation therewith about axis 36. Although all of the carrier components of the planetary gear set are not shown in the drawing, suffice it to say that a planetary gear 48 meshes with sun gear 44, as at 50, for actuating strut arm 32a through a ring gear 52 formed integrally with the strut arm. This planetary gear also meshes with a stationary outer bearing 60, as at 61, for establishing a reaction force and carries a pair of additional planetary gears 54a and 54b in mesh with a pair of ring gears 56a and 56b, respectively, as at 58a and 58b, respectively. Therefore, it can be seen that rotation of torque shaft 40 is effective through planetary gear train 42 to simultaneously rotate ring gears 56a,56b.

Ring gears 56a,56b are journaled in an outer housing 60 by ball bearing races, indicated by ball bearings 62. As stated above, it is desirable to fabricate these ring gears and ball races of hardened, heat treated steel.

Each ring gear 56a,56b have radially outwardly projecting mounting flanges 64. Referring back to FIG. 1 for the moment, ring gear 56a can be seen with a pair of diametrically disposed mounting flanges 64 which are arcuately shaped. These mounting flanges are provided for interchangeably mounting an actuator arm 16, as described below.

It should be noted that gear rings 56a,56b along with their meshing gear portions 58a, 58b, their ball races and their mounting flanges 64, are identical in construction except for the fact that they are oriented in oppositely facing directions in the gear train, longitudinally of axis 36, as is clearly visible in FIG. 2.

In order to facilitate the universal mounting of actuator arms 16, each actuator arm has identical mounting means on opposite axial sides thereof complementary to identically shaped mounting flanges 64 on either gear ring 56a, 56b for interchangeably mounting either asymmetrical actuator arm on either gear ring to be driven thereby. More specifically, each actuator arm has an identically shaped arcuate recess 66 on each opposite side thereof for receiving the complementarily shaped mounting flanges 64 of ring gears 56a,56b. Again, referring back to FIG. 1, it can be seen that the recesses 66 which are visible on that one side of the one actuator arm 16 are arcuately shaped for complementarily mating with arcuately shaped mounting flanges 64. A plurality of bolts 68 and nuts 70 are used to rigidly secure each actuator arm to its respective ring gear, through appropriate bores in the components.

From the foregoing, it can be seen that the right-hand actuator arm 16 as viewed in FIG. 2 is mounted to ring gear 56b on the left-hand side of the actuator arm, while the left-hand actuator arm 16 as viewed FIG. 2 is mounted to ring gear 56a on the right-hand side of that actuator arm. Still further, it can be understood that, notwithstanding the asymmetrical construction of the actuator arms as described in relation to FIG. 1, the right-hand actuator arm could be interchanged with the left-hand actuator arm, simply by securing the respective actuator arms to the opposite ring gear on the opposite side of the respective actuator arm. In other words, either actuator arm can be mounted to either ring gear on either side of either actuator arm.

It is readily apparent that the dual configuration of the actuator system described above, i.e. including two asymmetrical actuator arms, is fabricated and assembled by only one configuration for the ring gears and only one configuration for the actuator arms. This not only greatly reduces the costs of manufacture and inventory maintenance, but the ring gears can be fabricated of hardened steel and the actuator arms can be fabricated of lighter aluminum material to further reduce the manufacturing costs while providing a strong and durable yet lightweight construction, particularly applicable for aerospace applications.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A power driven actuator system of a type including a planetary gear train, comprising:
   power means including an elongate torque shaft coupled to the gear train;
   a pair of ring gears spaced longitudinally of the torque shaft as part of the planetary gear train, each ring gear having identical actuator arm mounting means thereon; and
   a pair of asymmetrical actuator arms for projecting radially outwardly of the torque shaft, each actuator arm having identical mounting means on opposite axial sides thereof complementary to the mounting means on either ring gear for interchangeably mounting either asymmetrical actuator arm on either ring gear to be driven thereby, said ring gears having identical mounting surface means facing in opposite axial directions of the torque shaft, and each actuator arm having mounting surface means on both axial sides thereof for mating with the mounting surface means of either ring gear.

2. The power driven actuator system of claim 1 wherein said asymmetrical actuator arms are configured to be mirror images of each other when mounted to the ring gears.

3. The power driven actuator system of claim 1 wherein said ring gears have arcuate mounting flange means defining said mounting surface means, and each actuator arm has arcuate recess means on both axial sides for receiving the mounting flange of either ring gear on either side of either actuator arm.

4. A power driven actuator system of a type including a planetary gear train, comprising:
   power means including an elongate torque shaft coupled to the gear train;
   a pair of ring gears spaced longitudinally of the torque shaft as part of the planetary gear train, each ring gear having identical mounting surface means facing in opposite axial directions of the torque shaft; and
   a pair of asymmetrical actuator arms configured to be mirror images of each other for projecting radially outwardly of the torque shaft, each actuator arm having identical mounting surface means on both axial sides thereof for mating with the mounting surface means of either ring gear whereby the asymmetrical actuator arms are interchangeably mountable on either ring gear to be driven thereby, said ring gears having arcuate mounting flange means defining said mounting surface means, and each actuator arm having arcuate recess means on both axial sides for receiving the mounting flange of either ring gear on either side of either actuator arm.

5. An actuator system, comprising:
   an elongate torque shaft;
   a pair of gears spaced longitudinally of the torque shaft and operatively associated therewith to be driven thereby, each gear having identical actuator arm mounting means thereon; and
   a pair of asymmetrical actuator arms for projecting radially outwardly of the torque shaft, each actuator arm having identical mounting means complementary to the mounting means of the gears whereby either actuator arm can be mounted on either gear spaced longitudinally of the torque shaft, each of said ring gears having mounting means thereon facing in opposite axial directions of the torque shaft, and each actuator arm having mounting means on both axial sides thereof for mating with the mounting means of either gear.

* * * * *